US011902949B2

(12) United States Patent
Shi

(10) Patent No.: US 11,902,949 B2
(45) Date of Patent: Feb. 13, 2024

(54) WIRELESS COMMUNICATION METHOD AND COMMUNICATION DEVICE

(71) Applicant: GUANGDONG OPPO MOBILE TELECOMMUNICATIONS CORP., LTD., Guangdong (CN)

(72) Inventor: Zhihua Shi, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 491 days.

(21) Appl. No.: 17/163,715

(22) Filed: Feb. 1, 2021

(65) Prior Publication Data

US 2021/0185675 A1 Jun. 17, 2021

Related U.S. Application Data

(63) Continuation of application No. PCT/CN2018/100016, filed on Aug. 10, 2018.

(51) Int. Cl.
*H04W 28/26* (2009.01)
*H04W 72/0453* (2023.01)
*H04W 16/14* (2009.01)
*H04W 74/08* (2009.01)

(52) U.S. Cl.
CPC ....... *H04W 72/0453* (2013.01); *H04W 16/14* (2013.01); *H04W 74/0808* (2013.01)

(58) Field of Classification Search
CPC ............. H04W 84/12; H04W 72/0446; H04W 72/0453; H04W 72/04; H04W 28/26; H04W 28/20
See application file for complete search history.

(56) References Cited

U.S. PATENT DOCUMENTS

2019/0124694 A1* 4/2019 Chendamarai Kannan ............... H04W 74/004

FOREIGN PATENT DOCUMENTS

CN 104885542 A 9/2015
WO 2016081375 5/2017

OTHER PUBLICATIONS

EPO, Communication Pursuant to Article 94(3) EPC issued in EP Application No. 18928992.9, dated Apr. 25, 2022.
NEC, Discussion on LAA frame structure, 3GPP TSG RAN WG1 Meeting #82bis, R1-155274, Oct. 2015, 3 pages.
EPO, Extended European Search Report for EP Application No. 18928992.9, dated Jun. 24, 2021.

* cited by examiner

*Primary Examiner* — Tu X Nguyen
(74) *Attorney, Agent, or Firm* — Hodgson Russ LLP

(57) ABSTRACT

Embodiments of the present application provide a wireless communication method and a communication device, capable of avoiding causing mutual interference between communication performed over an unlicensed frequency band and other communication. The method comprises: a first device communicates with a second device by means of a first frequency domain part in a first sounding bandwidth of the unlicensed frequency band, wherein the first sounding bandwidth comprises the first frequency domain part and a first reserved resource; the first reserved resource is located at at least one side of the first sounding bandwidth; and the first reserved resource is a protective frequency band.

20 Claims, 4 Drawing Sheets

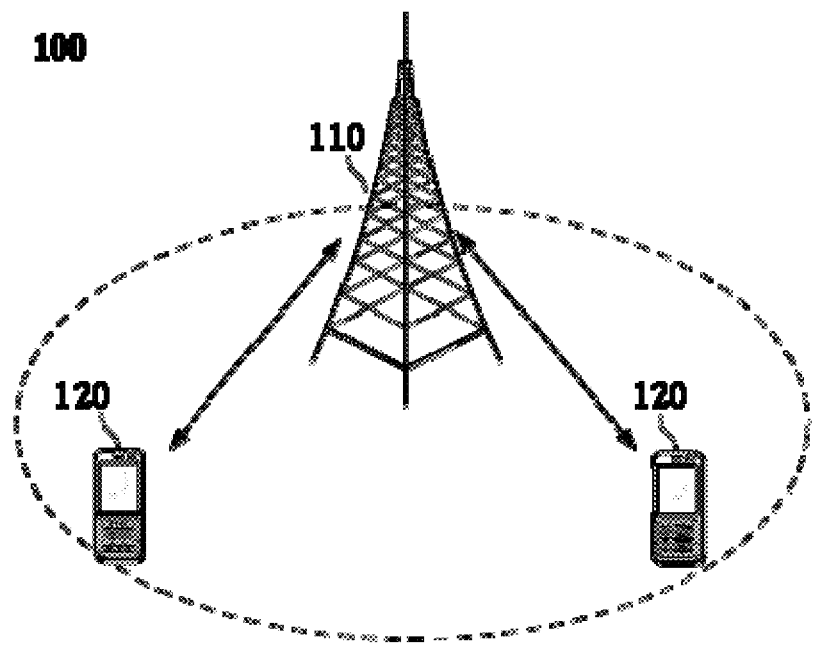

A first device communicates with a second device by means of a first frequency domain part in a first sounding bandwidth of an unlicensed frequency band, wherein the first sounding bandwidth comprises the first frequency domain part and a first reserved resource; the first reserved resource is located on at least one side of the first sounding bandwidth; and the first reserved resource is a protective frequency band — 210

Fig. 2

WIRELESS COMMUNICATION METHOD AND COMMUNICATION DEVICE

CROSS-REFERENCE TO RELATED APPLICATION

This application is a continuation of PCT Application No. PCT/CN2018/100016, filed Aug. 10, 2018, the entire contents of which is incorporated herein by reference.

TECHNICAL FIELD

The embodiments of the present application relate to the field of communication technologies, and in particular, relate to a wireless communication method and a communication device.

BACKGROUND

In a New Radio unlicensed (NR-U) system, a communication device uses an unlicensed frequency band to communicate according to a principle of "Listen Before Talk". That is, the communication device needs to perform channel listening, before performing signal transmission on a channel of the unlicensed frequency band. Only when a result of the channel listening is that the channel is idle, the communication device can send signals. If the result of the channel listening of the communication device on the channel of the unlicensed frequency band is that the channel is busy, the communication device cannot send signals.

Because the NR-U system may coexist with a heterogeneous system (for example, a NR-U system and a Long Term Evolution Licensed-Assisted Access (LTE-LAA) system or Wireless Fidelity (Wi-Fi) system share the same frequency spectrum or use adjacent frequency spectrum), the communication of the NR-U system may affect the channel listening and signal transmission of the heterogeneous system.

SUMMARY

The embodiments of the present application provide a wireless communication method and a communication device, which can avoid interference between communications performed on an unlicensed frequency band and other communications.

In a first aspect, there is provided a wireless communication method, including: communicating, by a first device, with a second device through a first frequency domain part in a first listening bandwidth of an unlicensed frequency band, wherein the first listening bandwidth includes the first frequency domain part and a first reserved resource, the first reserved resource is located on at least one side of the first listening bandwidth, and the first reserved resource is a guard band.

In a second aspect, there is provided a communication device for performing the method in the above first aspect.

Specifically, the communication device includes functional modules for performing the method in the above first aspect.

In a third aspect, there is provided a communication device, including a processor and a memory. The memory is used to store a computer program, and the processor is used to call and run a computer program stored in the memory to perform the method in the above first aspect.

In a fourth aspect, there is provided a chip for implementing the method in the above first aspect.

Specifically, the chip includes: a processor, configured to call and run a computer program from a memory, such that a device installed with the chip executes the method in the above first aspect.

In a fifth aspect, there is provided a computer-readable storage medium for storing a computer program that enables a computer to execute the method in the above first aspect.

In a sixth aspect, there is provided a computer program product, including computer program instructions that cause a computer to execute the method in the above first aspect.

In a seventh aspect, there is provided a computer program, which when running on a computer, causes a computer to execute the method in the above first aspect.

Through the above technical solutions, the first device communicates with the second device through the first frequency domain part in the first listening bandwidth of the unlicensed frequency band, wherein the first listening bandwidth includes the first frequency domain part and a first reserved resource, the first reserved resource is located on at least one side of the first listening bandwidth, and the first reserved resource is the guard band. Since at least one side of the first frequency domain part for communication has the reserved resource as the guard band, it can prevent the communication performed by the first frequency domain part from causing interference to other communications. Specifically, it can prevent the signal transmission of the NR-U system on the listening bandwidth from interfering with the signal transmission of the heterogeneous system (such as Wi-Fi or LTE-LAA system) on the adjacent channel, so as to better realize the coexist of the systems on the unlicensed frequency band.

BRIEF DESCRIPTION OF THE DRAWINGS

FIG. 1 is a schematic diagram of a communication system architecture provided by an embodiment of the present application.

FIG. 2 is a schematic diagram of a wireless communication method provided by an embodiment of the present application.

DETAILED DESCRIPTION

Figure 3:
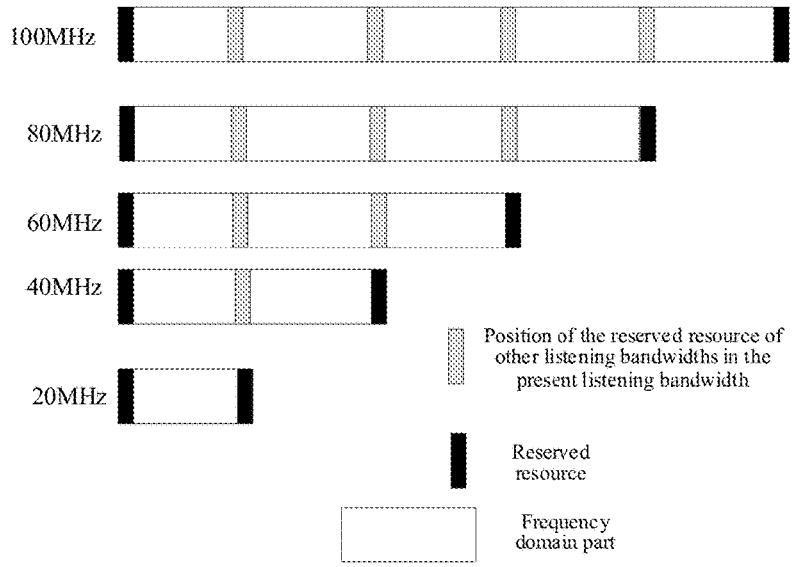
FIG. 3 is a schematic diagram of a relationship between various listening bandwidths according to an embodiment of the present application.

The technical solutions in the embodiments of the present application will be described below in conjunction with the drawings in the embodiments of the present application. Obviously, the described embodiments are a part of the embodiments of the present application, rather than all of the embodiments. Based on the embodiments in the present application, all other embodiments obtained by those of ordinary skill in the art without creative work should fall within the scope of the present application.

The technical solutions of the embodiments of the present application may be applied to various communication systems, such as a Global System of Mobile communication (GSM) system, a Code Division Multiple Access (CDMA) system, a Wideband Code Division Multiple Access (WCDMA) system, General Packet Radio Service (GPRS), a Long Term Evolution (LTE) system, a LTE Frequency Division Duplex (FDD) system, LTE Time Division Duplex (TDD), a Universal Mobile Telecommunication System (UMTS), a Worldwide Interoperability for Microwave Access (WiMAX) communication system, a 5G system, or the like.

Exemplarily, a communication system 100 applied in the embodiments of the present application is shown in FIG. 1. The communication system 100 may include a network device 110, and the network device 110 may be a device that communicates with a terminal device 120 (or called a communication terminal or a terminal). The network device 110 may provide communication coverage for a specific geographic area, and may communicate with terminal devices located in the coverage area. Optionally, the network device 110 may be a Base Transceiver Station (BTS) in a GSM system or a CDMA system, or a NodeB (NB) in a WCDMA system, or an Evolutional Node B (eNB or eNodeB) in an LTE system, or a wireless controller in a Cloud Radio Access Network (CRAN). Alternatively, the network device may be a mobile switching center, a relay station, an access point, a vehicle-mounted device, a wearable device, a hub, a switch, a bridge, a router, a network side device in a 5G network, a network device in a future evolution of a Public Land Mobile Network (PLMN), or the like.

The communication system 100 further includes at least one terminal device 120 located within the coverage area of the network device 110. As used herein, the "terminal device" includes, but is not limited to, connection via wired lines, such as via a Public Switched Telephone Network (PSTN), Digital Subscriber Line (DSL), a digital cable, and a direct cable; and/or another data connection/network; and/or connection via a wireless interface, such as for a cellular network, a Wireless Local Area Network (WLAN), a digital TV network such as a DVB-H network, a satellite network, or a AM-FM broadcast transmitter; and/or a device of another terminal device that is disposed to receive/send communication signals; and/or an Internet of Things (IoT) device. The terminal device disposed to communicate through a wireless interface may be referred to as a "wireless communication terminal", a "wireless terminal" or a "mobile terminal". Examples of the mobile terminal include, but are not limited to, a satellite or cellular phone; a Personal Communications System (PCS) terminal that can combine a cellular radio phone with data processing, fax and data communication capabilities; a PDA that may include a radio telephone, a pager, Internet/Intranet access, a web browser, a notebook, a calendar, and/or a Global Positioning System (GPS) receiver; and a conventional laptop and/or palmtop receiver or another electronic device including a radio telephone transceiver. The terminal device may refer to an access terminal, User Equipment (UE), a subscriber unit, a subscriber station, a mobile station, a mobile stage, a remote station, a remote terminal, a mobile device, a user terminal, a terminal, a wireless communication device, a user agent, or a user device. The access terminal may be a cellular phone, a cordless phone, a Session Initiation Protocol (SIP) phone, a Wireless Local Loop (WLL) station, a Personal Digital Assistant (PDA), a handheld device with wireless communication functions, a computing device, another processing device connected to a wireless modem, an in-vehicle device, a wearable device, a terminal device in a 5G network, a terminal device in a future evolution of a PLMN, or the like.

Optionally, Device to Device (D2D) communication may be performed between the terminal devices 120.

Optionally, the 5G system or 5G network may also be referred to as a New Radio (NR) system or NR network.

FIG. 1 exemplarily shows one network device and two terminal devices. Optionally, the communication system 100 may include a plurality of network devices and other numbers of terminal devices may be included within the coverage of each network device, which is not specifically limited in the embodiment of the present application.

Optionally, the communication system 100 may further include other network entities such as a network controller and a mobility management entity, which is not specifically limited in the embodiment of the present application.

It should be understood that the device with communication functions in the network/system in the embodiments of the present application may be referred to as a communication device. Taking the communication system 100 shown in FIG. 1 as an example, the communication device may include the network device 110 and the terminal device 120 with communication functions. The network device 110 and the terminal device 120 may be the specific devices as described above, which will not be repeated herein. The communication device may further include other devices in the communication system 100, for example, other network entities such as a network controller and a mobility management entity, which is not specifically limited in the embodiment of the present application.

It should be understood that the terms "system" and "network" herein are often used interchangeably. The term "and/or" herein is only an association relationship describing associated objects, which means that there may be three kinds of relationships. For example, A and/or B may mean three situations including A exists alone, both A and B exist, and B exists alone. In addition, the character "I" herein generally indicates that the associated objects in the context are in an "or" relationship.

FIG. 2 is a schematic flowchart of a wireless communication method 200 according to an embodiment of the present application.

Optionally, a first device mentioned below may be a terminal device, in which case a second device may be a network device; or, the first device mentioned below may be a network device, in which case the second device may be a terminal device. Both the first device and the second device may be terminal devices, which is not specifically limited in the embodiment of the present application.

In step 210, the first device communicates with the second device through a first frequency domain part in a first listening bandwidth of an unlicensed frequency band, where the first listening bandwidth includes the first frequency domain part and a first reserved resource, the first reserved resource is located on at least one side of the first listening bandwidth, and the first reserved resource is a guard band.

Optionally, in the embodiment of the present application, the first reserved resource may be the guard band of the first listening bandwidth or the first frequency domain part. Even if the first reserved resource belongs to other listening bandwidths, it may not be used as the guard band of the other listening bandwidths or the frequency domain part included in the other listening bandwidths.

Optionally, the listening bandwidth (for example, the first listening bandwidth, a second listening bandwidth, a third listening bandwidth, or the like) mentioned in the embodiment of the present application may be a sub-band or a broadband.

The sub-band is the smallest bandwidth unit that can perform channel listening (channel sensing), and a size of the broadband is an integer multiple of that of the sub-band. As an example, the size of the broadband may be the same as a size of a carrier bandwidth.

For example, in the unlicensed frequency band of 5 GHz, the size of the sub-band may be 20 MHz, and the size of the broadband may be 20 MHz, 40 MHz, 60 MHz, 80 MHz, 100 MHz, or the like.

For another example, in the unlicensed frequency with a high-frequency, the size of the sub-band may be 512 MHz, and the size of the broadband may be 512 MHz, 1024 MHz, 2048 MHz, or the like.

In the NR system, the network device (which may be the first device or the second device in the present application) may configure, for the terminal device, parameters, including a frequency domain reference point (absoluteFrequencyPointA (i.e., subcarrier 0 of Common Resource Block (CRB) 0)), one or more carriers (for example, a plurality of carriers may be used in Carrier Aggregation (CA) scenarios), a subcarrier spacing (SCS) of each carrier, a start position of each carrier (offsetToCarrier, a distance between the first available subcarrier on each carrier and the frequency domain reference point, where the unit thereof may be a Physical Resource Block (PRB) determined according to the SCS), a size of bandwidth of each carrier (carrierBandwidth, the unit thereof may be determined according to the SCS), and the like. The terminal device may determine a frequency domain position and a size of bandwidth of the carrier to be used according to the configuration of the network device.

Optionally, in the embodiment of the present application, the network device may configure a plurality of listening bandwidths for the same terminal device, the plurality of listening bandwidths may be used for communication between the terminal device and the network device, and the plurality of listening bandwidths may be used respectively for communication of different services, communication at different times, or communication under different channel conditions between the terminal device and the network device (for example, when the channel is relatively busy, a small listening bandwidth may be selected for communication, and when the channel is relatively idle, a large listening bandwidth may be selected for communication).

Optionally, in the embodiment of the present application, the network device may configure different listening bandwidths for different terminal devices. For example, the terminal device with a large demand for service data transmission may be configured with a larger listening bandwidth, and the terminal device with a small demand for service data transmission may be configured with a smaller listening bandwidth.

Optionally, the frequency domain part (for example, the first frequency domain part, a second frequency domain part, a third frequency domain part, or the like) mentioned in the embodiment of the present application may be used for communication between the first device and the second device. However, it does not mean that all resources in the frequency domain part must be occupied during communication, and the occupation of the resources in the frequency domain part may be determined according to actual transmission situations. For example, the network device may allocate partial resource in the frequency domain part for communication between the first device and the second device according to the amount of data actually transmitted.

The frequency domain part mentioned in the embodiment of the present application may be equal to the Bandwidth Part (BWP) on the corresponding listening bandwidth, or may be smaller than the BWP. The BWP mentioned in the embodiment of the present application may include an integer number of continuous frequency domain resource units. The frequency domain resource unit may optionally be a PRB, and may also be other frequency domain resource units. For example, an integer number of subcarriers may also be used as frequency domain resource units, etc., which is not specifically limited in the embodiment of the present application. The BWP mentioned in the embodiment of the application is smaller than the listening bandwidth.

It should be understood that the BWP mentioned in the embodiment of the present application may be an uplink BWP or a downlink BWP, and the uplink BWP and the downlink BWP may be the same or different.

Similarly, the frequency domain part used for communication and the reserved resource used as the guard band mentioned in the embodiment of the present application may correspond to uplink or downlink. The frequency domain part and/or reserved resource corresponding to the uplink may be the same as or different from the frequency domain part and/or reserved resource corresponding to the downlink.

Optionally, in the embodiment of the present application, for uplink, the frequency domain part may occupy a certain percentage of the listening bandwidth to meet a bandwidth occupation requirement. For example, in the frequency band of 5 GHz, the frequency domain part may occupy at least 80% of the listening bandwidth. For another example, in the frequency band of 60 GHz, the frequency domain part may occupy at least 70% of the listening bandwidth.

The first device or the second device may determine a start position, a length and/or an end position of the first BWP from a BWP set based on at least one of a size of the first listening bandwidth, a subcarrier spacing of the first listening bandwidth, and a frequency domain position of the first listening bandwidth, where the first BWP belongs to the first listening bandwidth and includes the first frequency domain part.

Both terminals as the communication parties (the first device and the second device) may determine the start position, the length, and/or the end position of the first BWP based on the above principles.

In the embodiment of the present application, at least one of the followings of the listening bandwidths corresponding to different BWPs in the BWP set may be different: the size of the listening bandwidth, the frequency domain position of the listening bandwidth and the subcarrier spacing of the listening bandwidth.

The frequency domain position of the listening bandwidth mentioned herein may be an absolute frequency domain position of the listening bandwidth. Alternatively, the frequency domain position mentioned herein may also be a position of the listening bandwidth in the carrier bandwidth.

Optionally, below the frequency band of 6 GHz, the listening bandwidth set may include at least one of {20 MHz, 40 MHz, 60 MHz, 80 MHz, and 100 MHz}.

Optionally, the BWP set may also be related to the maximum bandwidth of a system carrier. For example, the number of BWP configurations included in the BWP set may be determined based on the maximum bandwidth of the system carrier.

Optionally, the network device (which may be the first device or the second device) may determine the start position, the length and/or the end position, etc., of the first BWP (which may be selected from the BWP set according to the above principles, or may be determined based on other manners), and indicate the start position, the length and/or the end position, etc., of the first BWP to the terminal device. Then the terminal device may determine the first BWP based on the indication of the terminal device, and thus may determine the first frequency domain part based on the first BWP.

Optionally, the network device may configure one or more BWPs (optionally up to 4 BWPs) for the terminal device on the carrier. Specifically, a Cyclic Prefix (CP) type of each BWP, the SCS of the BWP, and the frequency domain position and bandwidth size of the BWP may be configured (a resource indicator value may be used, for example, assuming that the bandwidth size of the carrier is 275 PRBs, starting from the start position of the carrier, the PRB is determined according to its corresponding SCS as the unit with a value range of 0 to 37949). That is, the configuration of the BWP in the NR system may be any start position within one carrier and any length not greater than the number of PRBs included in the carrier bandwidth.

Specifically, the network device side may support a large bandwidth of a single carrier, and can determine the number of Resource Blocks (RBs) included in the BWP according to factors such as an available subcarrier spacing, processing complexity (for example, the maximum number of subcarriers does not exceed 3300), and minimum guard band reservation. As an example, under different bandwidths and subcarrier spacing, the number of RBs included may be as shown in Tables 1 and 2 below.

Table 1 shows the number of RBs included in the BWP under different subcarrier spacings and bandwidths in the FR1 frequency domain (below 6 GHz); and Table 2 shows the number of RBs included in the BWP under different subcarrier spacings and bandwidths in the FR2 frequency domain (above 6 GHz).

Optionally, in the embodiment of the present application, the network device may configure the frequency domain parts of various sizes and/or positions for the same BWP of the same listening bandwidth. For example, for one BWP, all of the resources may be used for communication (the frequency domain part may be the entire BWP), or a part of the resources (the frequency domain part may be partial resource of the BWP at this time) is used for communication. The specific frequency domain part to be selected can be determined according to the specific situation, for example, according to the service requirements between the network device and the terminal device.

Optionally, in the embodiment of the present application, the network device may configure one or more frequency domain parts for each listening bandwidth (the positions and/or sizes between a plurality of frequency domain parts may be different). When the plurality of frequency domain parts are configured, the same terminal device may only correspond to one frequency domain part. When different terminal devices use the same listening bandwidth, the frequency domain parts used may be the same or different. Or, when the plurality of frequency domain parts are configured, the same terminal device may determine one frequency domain part from the plurality of frequency domain parts and communicate with the network device. For example, the terminal device may select the frequency domain part based on current service requirements, or the terminal device may determine the frequency domain part based on indication of the network device.

Optionally, the reserved resource (for example, the first reserved resource, the second reserved resource, the third reserved resource, or the like) as the guard band mentioned in the embodiment of the present application may be located on at least one side of the frequency domain part of the listening bandwidth to which it belongs, and may not be used to transmit any data or signals, such that interference between different bandwidths or different systems can be avoided at this time.

It should be understood that in the embodiment of the present application, the reserved resource (for example, the first reserved resource, the second reserved resource, or the third reserved resource) being located on at least one side of

TABLE 1

| SCS (KHz) | 5 MHz NRB | 10 MHz NRB | 15 MHz NRB | 20 MHz NRB | 25 MHz NRB | 30 MHz NRB | 40 MHz NRB | 50 MHz NRB | 60 MHz NRB | 70 MHz NRB | 80 MHz NRB | 90 MHz NRB | 100 MHz NRB |
|---|---|---|---|---|---|---|---|---|---|---|---|---|---|
| 15 | 25 | 52 | 79 | 106 | 133 | 160 | 216 | 270 | N.A | N.A | N.A | N.A | N.A |
| 30 | 11 | 24 | 38 | 51 | 65 | 78 | 106 | 133 | 162 | 189 | 217 | 245 | 273 |
| 60 | N.A | 11 | 18 | 24 | 31 | 38 | 51 | 65 | 79 | 93 | 107 | 121 | 135 |

TABLE 2

| SCS (KHz) | 50 MHz $N_{RB}$ | 100 MHz $N_{RB}$ | 200 MHz $N_{RB}$ | 400 MHz $N_{RB}$ |
|---|---|---|---|---|
| 60 | 66 | 132 | 264 | N.A |
| 120 | 32 | 66 | 132 | 264 |

Optionally, in the embodiment of the present application, for the same listening bandwidth, the network device may configure BWPs of various sizes and/or positions. For example, for one listening bandwidth, the included BWP may be a BWP that coincides with the center of the listening bandwidth, and may be a BWP that does not coincide with the center of the listening bandwidth.

the frequency domain part of the listening bandwidth to which it belongs means that it is located on one side or on both sides (for example, as shown in FIG. 3, the reserved resource is located on both sides of the frequency domain part that can be used for data transmission) of the frequency domain part. As to whether it is located on one side or on both sides, it may be determined according to the requirements for anti-interference and communication performance of the adjacent frequency bands on both sides. For example, if the adjacent frequency bands on one side have low requirements for anti-interference, the guard band may be only provided on the other side. If the adjacent frequency bands on both sides have high requirements for anti-interference, the guard band may be provided on both sides.

Optionally, in the embodiment of the present application, the first reserved resource serving as the guard band of the first listening bandwidth may include a first sub-band, where the first sub-band may be located on a low-frequency side of the first listening bandwidth.

The size of the first sub-band may be determined based on at least one of:

a radio frequency index requirement, a size of the first listening bandwidth, a subcarrier spacing of the first frequency domain part, a size of the first frequency domain part, a position of the first sub-band, a position of the first listening bandwidth, and a second sub-band included in the first reserved resource and located on a high-frequency side of the first listening bandwidth.

The above-mentioned radio frequency index requirement may be a requirement for the size of the first sub-band, which may be understood as a threshold, and the size of the first sub-band needs to exceed the threshold.

Optionally, the size of the first sub-band may be positively correlated with the size of the first listening bandwidth.

Optionally, the size of the first sub-band may be positively correlated with the size of the subcarrier spacing of the first listening bandwidth.

Optionally, the position of the first sub-band may affect the size of the first sub-band. For example, since the first sub-band is on the low-frequency side, when communication with the resource adjacent to the low-frequency side has low requirements for anti-interference, the size of the first sub-band may be smaller.

Optionally, the frequency domain position of the first listening bandwidth may affect the size of the first sub-band. For example, the relative position and the like of the first listening bandwidth in the entire system bandwidth may affect the size of the first sub-band.

Optionally, when the first sub-band is a sideband on the low-frequency side of the carrier bandwidth to which the first listening bandwidth belongs, if the carrier bandwidth includes a plurality of listening bandwidths and at least two of the plurality of listening bandwidths include the sideband on the low-frequency side of the carrier bandwidth, the size of the first sub-band may be determined based on the maximum value that satisfies the radio frequency index requirement of at least two listening bandwidths. Further optionally, the sizes of the reserved resources on the low-frequency sides of the at least two listening bandwidths are the same.

Optionally, the second sub-band included in the first reserved resource and located on the high-frequency side of the first listening bandwidth may affect the size of the first sub-band. For example, requirements of the second sub-band and the first sub-band are the same, the ratio between the second sub-band and the first sub-band is a preset value, or the like.

Optionally, the first reserved resource includes the second sub-band, and the second sub-band is located on a high-frequency side of the first listening bandwidth.

The size of the second sub-band is determined based on at least one of:

a radio frequency index requirement, a size of the first listening bandwidth, a subcarrier spacing of the first frequency domain part, a size of the first frequency domain part, a position of the second sub-band, a position of the first listening bandwidth, and the first sub-band included in the first reserved resource and located on a low-frequency side of the first listening bandwidth.

The above-mentioned radio frequency index requirement may be a requirement for the size of the second sub-band, which may be understood as a threshold, and the size of the second sub-band needs to exceed the threshold.

Optionally, the size of the second sub-band may be positively correlated with the size of the first listening bandwidth.

Optionally, the size of the second sub-band may be positively correlated with the size of the subcarrier spacing of the first listening bandwidth.

Optionally, the position of the second sub-band may affect the size of the first sub-band. For example, since the second sub-band is on the high-frequency side, when communication with the resource adjacent to the high-frequency side has low requirements for anti-interference, the size of the second sub-band may be smaller.

Optionally, the frequency domain position of the first listening bandwidth may affect the size of the second sub-band. For example, the position and the like of the first listening bandwidth in the entire system bandwidth may affect the size of the second sub-band.

Optionally, when the second sub-band is a sideband on the high-frequency side of the carrier bandwidth to which the first listening bandwidth belongs, if the carrier bandwidth includes a plurality of listening bandwidths and at least two of the plurality of listening bandwidths include the sideband on the high-frequency side of the carrier bandwidth, the size of the second sub-band may be determined based on the maximum value that satisfies the radio frequency index requirement of at least two listening bandwidths. Further optionally, the sizes of the reserved resources on the high-frequency sides of the at least two listening bandwidths are the same.

Optionally, the first sub-band included in the first reserved resource and located on the low-frequency side of the first listening bandwidth may affect the size of the second sub-band. For example, requirements of the second sub-band and the first sub-band are the same, the ratio between the second sub-band and the first sub-band is a preset value, or the like.

It should be understood that in the embodiment of the present application, for the first reserved resource, the first sub-band and the second sub-band may be included at the same time. In this case, the first sub-band and the second sub-band may be the same or different. Or, for the first reserved resource, it may consist of only the first sub-band or only the second sub-band.

Optionally, in the embodiment of the present application, when there are a plurality of listening bandwidths, for different listening bandwidths, the guard bands of the same size may be configured, or the guard bands of different sizes may be configured.

As an example, the following Tables 3 and 4 show the minimum guard band that should be reserved under different listening bandwidths. Table 3 shows the size of the minimum guard band that should be reserved under different subcarrier spacings and listening bandwidths in the FR1 frequency band. Table 4 shows the size of the minimum guard band that should be reserved under different subcarrier spacings and listening bandwidths in the FR2 frequency band.

TABLE 3

| SCS (KHz) | 5 MHz | 10 MHz | 15 MHz | 20 MHz | 25 MHz | 30 MHz | 40 MHz | 50 MHz | 60 MHz | 70 MHz | 80 MHz | 90 MHz | 100 MHz |
|---|---|---|---|---|---|---|---|---|---|---|---|---|---|
| 15 | 242.5 | 312.5 | 382.5 | 452.5 | 522.5 | 592.5 | 552.5 | 692.5 | N.A | N.A | N.A | N.A | N.A |
| 30 | 505 | 665 | 645 | 805 | 785 | 945 | 905 | 1045 | 825 | 965 | 925 | 885 | 845 |
| 60 | N.A | 1010 | 990 | 1330 | 1310 | 1290 | 1610 | 1570 | 1530 | 1490 | 1450 | 1410 | 1370 |

TABLE 4

| SCS (KHz) | 50 MHz | 100 MHz | 200 MHz | 400 MHz |
|---|---|---|---|---|
| 60 | 1210 | 2450 | 4930 | N.A |
| 120 | 1900 | 2420 | 4900 | 9860 |

Optionally, in the embodiment of the present application, there may be multiple sizes of listening bandwidths in the system. The multiple listening bandwidths may be respectively used for different terminal devices, or the same terminal device may use different listening bandwidths under different time or service requirements. The following takes an example in which the available listening bandwidth of the system includes the first listening bandwidth and the second listening bandwidth, or includes the first listening bandwidth and the third listening bandwidth, to illustrate the relationship between the listening bandwidths.

Optionally, in the embodiment of the present application, a third sub-band of the first reserved resource of the first listening bandwidth belongs to a second listening bandwidth of the unlicensed frequency band, and the second listening bandwidth includes a second frequency domain part and a second reserved resource, where the second frequency domain part is available for wireless communication transmission, the second reserved resource is located on at least one side of the second listening bandwidth, the second reserved resource is a guard band, and at least part of frequency domain resources of the second reserved resource and the third sub-band do not overlap.

Similar to the first reserved resource, the second reserved resource as the guard band means that the second reserved resource can be used as the guard band of the second listening bandwidth or the second frequency domain part.

The second reserved resource as the guard band of the second listening bandwidth being located on at least one side of the second listening bandwidth means that it can be located on one side or on both sides of the second listening bandwidth. As to whether it is located on one side or on both sides, if one side, whether it is located on the high-frequency side or the low-frequency side, it can be determined according to actual conditions, for example, based on the anti-interference requirements and communication performance requirements of adjacent frequency domain resources of the second listening bandwidth.

The manner of determining the size of the sub-band on the high-frequency side of the listening bandwidth or the sub-band on the low-frequency side of the listening bandwidth of the second reserved resource may refer to the description of the first reserved resource, which are repeated herein for brevity.

The third sub-band may be a part of the resource of the first reserved resource of the first listening bandwidth, which belongs to the second listening bandwidth of the unlicensed frequency band.

The third sub-band may include at least part of the reserved resource of the first reserved resource, for example, may include all the reserved resources of the first reserved resource, or include the first sub-band in the first reserved resource, or include the second sub-band in the first reserved resource. At least part of reserved resources of the second reserved resource and the third sub-band do not overlap.

For example, as shown in FIG. 3, for the listening bandwidth of 40 MHz, it may include the reserved resources on both sides of 20 MHz, and the reserved resource on the right side of 20 MHz and the reserved resource of 40 MHz do not overlap, and the reserved resource on the left side of 20 MHz overlaps with the reserved resource on the left side of 40 MHz. For the listening bandwidth of 60 MHz, it may include reserved resources on both sides of 20 MHz and 40 MHz, and the reserved resource on the right side of 20 MHz and 40 MHz and the reserved resource of 60 MHz do not overlap, and the reserved resource on the left side of 20 MHz and 40 MHz overlaps with the reserved resource on the left side of 60 MHz. For the listening bandwidth of 80 MHz, it may include reserved resources on both sides of 20 MHz, 40 MHz and 60 MHz, and the reserved resource on the right side of 20 MHz, 40 MHz and 60 MHz and reserved resource of 80 MHz do not overlap, and the reserved resource on the left side of 20 MHz, 40 MHz and 60 MHz overlaps with the reserved resource on the left side of 80 MHz. For the 100 MHz listening bandwidth, it may include reserved resources on both sides of 20 MHz, 40 MHz, 60 MHz and 80 MHz, and the reserved resource on the right side of 20 MHz, 40 MHz, 60 MHz and 80 MHz and reserved resource of 100 MHz do not overlap, and the reserved resource on the left side of 20 MHz, 40 MHz, 60 MHz and 80 MHz overlaps with the reserved resource on the left side of 100 MHz.

It should be understood that, in addition to the first reserved resource, the first frequency domain part of the first listening bandwidth may have at least partially overlapping resource with the second frequency domain part of the second listening bandwidth. The overlapped resource can be available for the second listening bandwidth, that is, they may be used for data transmission.

For example, as shown in FIG. 3, for the listening bandwidth of 40 MHz, the frequency domain part of 20 MHz belongs to 40 MHz entirely, then the frequency domain part of 20 MHz can be used for data transmission for the listening bandwidth of 40 MHz. For the listening bandwidth of 60 MHz, the frequency domain part of 40 MHz all belongs to 60 MHz, then the frequency domain part of 40 MHz can be used for data transmission for the listening bandwidth of 60 MHz. For the listening bandwidth of 80 MHz, the frequency domain part of 60 MHz all belongs to 80 MHz, then the frequency domain part of 60 MHz can be used for data transmission for the listening bandwidth of 80 MHz. For the listening bandwidth of 100 MHz, the frequency domain part of 80 MHz all belongs to 100 MHz, then the frequency domain part of 80 MHz can be used for data transmission for the listening bandwidth of 100 MHz.

A part of the third sub-band of the first reserved resource that belongs to the second frequency domain part but does not belong to the second reserved resource may be used for data transmission, or may not be used for data transmission.

For example, as shown in FIG. 3, for the listening bandwidth of 40 MHz, the reserved resource on the right side of 20 MHz may be used for data transmission, or may not be used for data transmission. For the listening bandwidth of 60 MHz, the reserved resource on the right side of 20 MHz and 40 MHz may be used for data transmission, or may not be used for data transmission. For the listening bandwidth of 80 MHz, the reserved resource on the right side of 20 MHz, 40 MHz and 60 MHZ may be used for data transmission, or may not be used for data transmission. For the listening bandwidth of 100 MHz, the reserved resource on the right side of 20 MHz, 40 MHz, 60 MHZ and 100 MHZ may be used for data transmission, or may not be used for data transmission.

In one implementation, the second frequency domain part includes a part of the third sub-band that does not belong to the second reserved resource; and/or,
 a division of resource block group (RBG) in the second frequency domain part includes the part of the third sub-band that does not belong to the second reserved resource; and/or,
 a division of precoding resource block group (PRG) in the second frequency domain part includes the part of the third sub-band that does not belong to the second reserved resource.

In this implementation, the second frequency domain part may include an integer number of frequency domain units continuous in frequency domain. For example, the second frequency domain part may be an integer number of PRBs that are continuous in the frequency domain. Alternatively, the size of the second frequency domain part may be the entire BWP.

The second frequency domain part including the part of the third sub-band that does not belong to the second reserved resource may be understood as: the part of the third sub-band that does not belong to the second reserved resource may be used for data transmission.

The division of RBG in the second frequency domain part including the part of the third sub-band that does not belong to the second reserved resource may be understood as: the part of the third sub-band that does not belong to the second reserved resource may be used to transmit required data and the like in a RBG resource allocation manner.

Similarly, the division of PRG in the second frequency domain part including the part of the third sub-band that does not belong to the second reserved resource may be understood as: the part of the third sub-band that does not belong to the second reserved resource may be used to transmit required data and the like in a PRG transmission manner. The PRG transmission manner may be: the terminal device or network device can assume that the precoding matrix or beam direction used for signal transmission on the same PRG is the same.

In another implementation, the second frequency domain part does not include a part of the third sub-band that does not belong to the second reserved resource; and/or,
 a division of resource block group (RBG) in the second frequency domain part does not include the part of the third sub-band that does not belong to the second reserved resource; and/or,
 a division of precoding resource block group (PRG) in the second frequency domain part does not include the part of the third sub-band that does not belong to the second reserved resource In this implementation, the sum of the second frequency domain part and the part of the third sub-band that does not belong to the second reserved resource may include an integer number of frequency domain units continuous in the frequency domain. For example, the sum of the second frequency domain part and the part of the third sub-band that does not belong to the second reserved resource may be the entire BWP.

The second frequency domain part not including the part of the third sub-band that does not belong to the second reserved resource may be understood as: the part of the third sub-band that does not belong to the second reserved resource is not used for data transmission.

The division of RBG in the second frequency domain part not including the part of the third sub-band that does not belong to the second reserved resource may be understood as: the part of the third sub-band that does not belong to the second reserved resource cannot transmit required data and the like in a RBG resource allocation manner.

Similarly, the division of PRG in the second frequency domain part including the part of the third sub-band that does not belong to the second reserved resource may be understood as: the part of the third sub-band that does not belong to the second reserved resource cannot transmit required data and the like in a PRG transmission manner.

Optionally, in the embodiment of the present application, the first device is the terminal device and the second device is the network device, and first indication information sent by the second device is received by the first device,
 where the first indication information is used to determine whether the second frequency domain part includes a part of the third sub-band that does not belong to the second reserved resource; and/or,
 the first indication information is used to determine whether a division of RBG in the second frequency domain part includes the part of the third sub-band that does not belong to the second reserved resource; and/or,
 the first indication information is used to determine whether a division of PRG in the second frequency domain part includes the part of the third sub-band that does not belong to the second reserved resource.

For example, the first indication information may be used to indicate: whether the second frequency domain part includes the part of the third sub-band that does not belong to the second reserved resource; and/or whether the division of RBG in the second frequency domain part includes the part of the third sub-band that does not belong to the second reserved resource; and/or whether the division of PRG in the second frequency domain part includes the part of the third sub-band that does not belong to the second reserved resource. For example, when the first indication information carries a bit with a value of 1, the first indication information may indicate yes in the above-mentioned situations, and when the first indication information carries a bit with a value of 0, the first indication information may indicate no in the above-mentioned situations.

For another example, if the first indication information is sent (that is, the first indication information field appears or the first indication information related parameters are configured), it indicates yes in the above-mentioned situations; if the first indication information is not sent, it indicates no in the above-mentioned situations.

Optionally, in the embodiment of the present application, the first device is the network device and the second device is the terminal device, and the method further includes: sending, by the first device, second indication information to the second device,
 where the second indication information is used to determine whether the second frequency domain part includes a part of the third sub-band that does not belong to the second reserved resource; and/or, the second indication information is used to determine whether a division of RBG in the second frequency domain part includes the part of the third sub-band that does not belong to the second reserved resource; and/or, the second indication information is used to determine whether a division of PRG in the second frequency domain part includes the part of the third sub-band that does not belong to the second reserved resource.

For example, the second indication information may be used to indicate: whether the second frequency domain part includes the part of the third sub-band that does not belong to the second reserved resource; and/or whether the division of RBG in the second frequency domain part includes the part of the third sub-band that does not belong to the second reserved resource; and/or, whether the division of PRG in the second frequency domain part includes the part of the third sub-band that does not belong to the second reserved resource. For example, when the second indication information carries a bit with a value of 1, the second indication information may indicate yes in the above-mentioned situations, and when the second indication information carries a bit with a value of 0, the second indication information may indicate no in the above-mentioned situations.

For another example, if the second indication information is sent (that is, the first indication information field appears or the first indication information related parameters are configured), it indicates yes in the above-mentioned situations; if the second indication information is not sent, it indicates no in the above-mentioned situations.

Optionally, in the embodiment of the present application, whether the second frequency domain part includes the part of the third sub-band that does not belong to the second reserved resource; and/or, whether the division of resource block group (RBG) in the second frequency domain part includes the part of the third sub-band that does not belong to the second reserved resource; and/or, whether the division of PRG in the second frequency domain part includes the part of the third sub-band that does not belong to the second reserved resource may be determined according to specific conditions, for example, based on a resource demand by communication between the terminal device and network device.

Optionally, the first device may be a device that actively initiates communication, that is, the first device may be a device that performs channel listening. If a channel use right is obtained through the channel listening, the communication with the second device may be actively initiated. Alternatively, the first device may be a device that does not actively initiate communication, that is, the first device does not need to perform the channel listening, and the first device may perform blind detection of signals on an unlicensed frequency band to achieve the communication with the second device.

Optionally, in the embodiment of the application, it is assumed that the first device is a device for the channel listening. At this time, the first device may listen to the first listening bandwidth. After obtaining a use right of the first listening bandwidth, the first frequency domain part included in the first listening bandwidth may be used to communicate with the second device.

For example, the first device may listen to the bandwidth of 40 MHz, and if the listening succeeds and obtains the use right of the bandwidth of 40 MHz, the resource in the bandwidth of 40 MHz may be used to communicate with the second device.

It should be understood that when the first device performs the channel listening on the first listening bandwidth, the first listening bandwidth may be used as a whole for the channel listening, or the first listening bandwidth may be divided into two or more parts for the channel listening, which is not limited in the present application.

Figure 4:
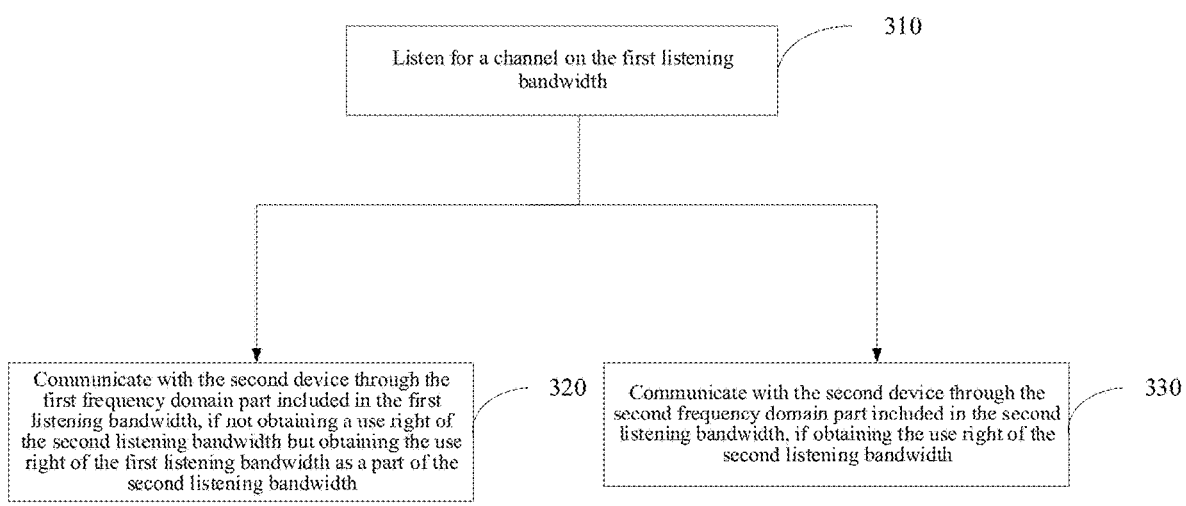
FIG. 4 is a schematic diagram of another wireless communication method provided by an embodiment of the present application.

Optionally, in the embodiment of the present application, it is assumed that the first device is a device used for the channel listening. At this time, the first device may listen to the second listening bandwidth (for example, in 310 of a method shown in FIG. 4). If a use right of the second listening bandwidth is not obtained but the use right of the first listening bandwidth as a part of the second listening bandwidth is obtained, the first frequency domain part included in the first listening bandwidth may be used to communicate with the second device (for example, in 320 of the method shown in FIG. 4). If the use right of the second listening bandwidth is obtained, the second frequency domain part included in the second listening bandwidth may be used to communicate with the second device (for example, in 330 of the method shown in FIG. 4).

Optionally, the second listening bandwidth may include a plurality of sub-listening bandwidths, and the first device may listen to the plurality of sub-listening bandwidths. If the plurality of sub-listening bandwidths are all successfully listened, the resources in the plurality of sub-listening bandwidths (that is, the second listening bandwidth) to communicate. If a part of the plurality of sub-listening bandwidths (for example, the first listening bandwidth) is successfully listened, the resource in the part of the plurality of sub-listening bandwidths may be used to communicate.

For example, if the second listening bandwidth is 40 MHz, the first device may simultaneously listen to the two 20 MHzs that make up the 40 MHz. If both 20 MHzs are successfully listened, the resource in the 40 MHz is used to communicate with the second device. If there is only one 20 MHz is successfully listened, the resource in the one 20 MHz is used to communicate with the second device.

Optionally, in the embodiment of the present application, a fourth sub-band of a third reserved resource of a third listening bandwidth of the unlicensed frequency band belongs to the first listening bandwidth;

where the third listening bandwidth includes a third frequency domain part and the third reserved resource, the third frequency domain part is available for wireless communication transmission, the third reserved resource is located on at least one side of the third listening bandwidth, the third reserved resource is a guard band, and at least part of frequency domain resources of the first reserved resource and the fourth sub-band do not overlap.

Similar to the first reserved resource or the second reserved resource, the third reserved resource as the guard band means that the third reserved resource can be used as the guard band of the third listening bandwidth or the third frequency domain part.

The third reserved resource being located on at least one side of the third listening bandwidth means that it can be located on one side or on both sides of the third listening bandwidth. As to whether it is located on one side or on both sides, and if on one side, whether it is located on the high-frequency side or the low-frequency side, they can be determined according to actual conditions, for example, based on the anti-interference requirements and communication performance requirements of adjacent frequency domain resources of the third listening bandwidth.

The manner of determining the size of the sub-band on the high-frequency side of the listening bandwidth or the sub-band on the low-frequency side of the listening bandwidth of the third reserved resource may refer to the description of the first reserved resource, which are not repeated herein for brevity.

The fourth sub-band may be a part of the resource of the third reserved resource of the third listening bandwidth, which belongs to the first listening bandwidth of the unlicensed frequency band.

The fourth sub-band may include at least part of the reserved resource of the third reserved resource, for example, may include all the reserved resource of the third reserved resource, or include the sub-band on the high-frequency side of the third reserved resource, or include sub-band on the low-frequency side of the first reserved resource. At least part of frequency domain resources of the first reserved resource and the fourth sub-band do not overlap.

For example, as shown in FIG. 3, for the listening bandwidth of 40 MHz, it may include reserved resource on both sides of 20 MHz, and the reserved resource on the right side of 20 MHz and reserved resource of 40 MHz do not overlap, and the reserved resource on the left side of 20 MHz overlaps with the reserved resource on the left side of 40 MHz. For the listening bandwidth of 60 MHz, it may include reserved resource on both sides of 20 MHz and 40 MHz, and the reserved resource on the right side of 20 MHz and 40 MHz and the reserved resource of 60 MHz do not overlap, and the reserved resource on the left side of 20 MHz and 40 MHz overlaps with the reserved resource on the left side of 60 MHz. For the listening bandwidth of 80 MHz, it may include reserved resource on both sides of 20 MHz, 40 MHz and 60 MHz, and the reserved resource on the right side of 20 MHz, 40 MHz and 60 MHz and reserved resource of 80 MHz do not overlap, and the reserved resource on the left side of 20 MHz, 40 MHz and 60 MHz overlaps with the reserved resource on the left side of 80 MHz. For the 100 MHz listening bandwidth, it may include reserved resource on both sides of 20 MHz, 40 MHz, 60 MHz and 80 MHz, and the reserved resource on the right side of 20 MHz, 40 MHz, 60 MHz and 80 MHz and reserved resource of 100 MHz do not overlap, and the reserved resource on the left side of 20 MHz, 40 MHz, 60 MHz and 80 MHz overlaps with the reserved resource on the left side of 100 MHz.

It should be understood that, in addition to the third reserved resource, the first frequency domain part of the first listening bandwidth may have at least partially overlapping resource with the third frequency domain part of the third listening bandwidth. The overlapped resource can be available for the first listening bandwidth, that is, may be used for data transmission.

For example, as shown in FIG. 3, for the listening bandwidth of 40 MHz, the frequency domain part of 20 MHz all belongs to 40 MHz, then the frequency domain part of 20 MHz can be used for data transmission for the listening bandwidth of 40 MHz. For the listening bandwidth of 60 MHz, the frequency domain part of 40 MHz all belongs to 60 MHz, then the frequency domain part of 40 MHz can be used for data transmission for the listening bandwidth of 60 MHz. For the listening bandwidth of 80 MHz, the frequency domain part of 60 MHz all belongs to 80 MHz, then the frequency domain part of 60 MHz can be used for data transmission for the listening bandwidth of 80 MHz. For the listening bandwidth of 100 MHz, the frequency domain part of 80 MHz all belongs to 100 MHz, then the frequency domain part of 80 MHz can be used for data transmission for the listening bandwidth of 100 MHz.

A part of the fourth sub-band of the third reserved resource that belongs to the first frequency domain part but does not belong to the first reserved resource may be used for data transmission, or may not be used for data transmission.

For example, as shown in FIG. 3, for the listening bandwidth of 40 MHz, the reserved resource on the right side of 20 MHz may be used for data transmission, or may not be used for data transmission. For the listening bandwidth of 60 MHz, the reserved resource on the right side of 20 MHz and 40 MHz may be used for data transmission, or may not be used for data transmission. For the listening bandwidth of 80 MHz, the reserved resource on the right side of 20 MHz, 40 MHz and 60 MHZ may be used for data transmission, or may not be used for data transmission. For the listening bandwidth of 100 MHz, the reserved resource on the right side of 20 MHz, 40 MHz, 60 MHZ and 80 MHZ may be used for data transmission, or may not be used for data transmission.

In one implementation, the first frequency domain part includes a part of the fourth sub-band that does not belong to the first reserved resource; and/or,
 a division of resource block group (RBG) in the first frequency domain part includes the part of the fourth sub-band that does not belong to the first reserved resource; and/or,
 a division of precoding resource block group (PRG) in the first frequency domain part includes the part of the fourth sub-band that does not belong to the first reserved resource.

In this implementation, the first frequency domain part includes an integer number of frequency domain units continuous in frequency domain.

In another implementation, the first frequency domain part does not include a part of the fourth sub-band that does not belong to the first reserved resource; and/or,
 a division of resource block group (RBG) in the first frequency domain part does not include the part of the fourth sub-band that does not belong to the first reserved resource; and/or,
 a division of precoding resource block group (PRG) in the first frequency domain part does not include the part of the fourth sub-band that does not belong to the first reserved resource.

Optionally, in the embodiment of the present application, the first device is the terminal device and the second device is the network device, and third indication information sent by the second device is received by the first device,
 where the third indication information is used to determine whether the first frequency domain part includes a part of the fourth sub-band that does not belong to the first reserved resource; and/or,
 the third indication information is used to determine whether a division of the RBG in the first frequency domain part includes the part of the fourth sub-band that does not belong to the first reserved resource; and/or,
 the third indication information is used to determine whether a division of the PRG in the first frequency domain part includes the part of the fourth sub-band that does not belong to the first reserved resource.

For example, the third indication information may be used to indicate: whether the first frequency domain part includes the part of the fourth sub-band that does not belong to the first reserved resource; and/or whether the division of RBG in the first frequency domain part includes the part of the fourth sub-band that does not belong to the first reserved resource; and/or whether the division of PRG in the first frequency domain part includes the part of the fourth sub-band that does not belong to the first reserved resource. For example, when the third indication information carries a bit with a value of 1, the third indication information may indicate yes in the above-mentioned situations, and when the third indication information carries a bit with a value of 0, the third indication information may indicate no in the above-mentioned situations.

For another example, if the third indication information is sent (that is, the third indication information field appears or the third indication information related parameters are configured), it indicates yes in the above-mentioned situations; if the third indication information is not sent, it indicates no in the above-mentioned situations.

Optionally, in the embodiment of the present application, the first device is the network device and the second device is the terminal device, and the method further includes: sending, by the first device, fourth indication information to the second device,
  where the fourth indication information is used to determine whether the first frequency domain part includes a part of the fourth sub-band that does not belong to the first reserved resource; and/or,
  the fourth indication information is used to determine whether a division of RBG in the first frequency domain part includes the part of the fourth sub-band that does not belong to the first reserved resource; and/or,
  the fourth indication information is used to determine whether a division of PRG in the first frequency domain part includes the part of the fourth sub-band that does not belong to the first reserved resource.

For example, the fourth indication information may be used to indicate: whether the first frequency domain part includes the part of the fourth sub-band that does not belong to the first reserved resource; and/or whether the division of RBG in the first frequency domain part includes the part of the fourth sub-band that does not belong to the first reserved resource; and/or whether the division of PRG in the first frequency domain part includes the part of the fourth sub-band that does not belong to the first reserved resource. For example, when the fourth indication information carries a bit with a value of 1, the fourth indication information may indicate yes in the above-mentioned situations, and when the fourth indication information carries a bit with a value of 0, the fourth indication information may indicate no in the above-mentioned situations.

For another example, if the fourth indication information is sent (that is, the fourth indication information field appears or the fourth indication information related parameters are configured), it indicates yes in the above-mentioned situations; if the fourth indication information is not sent, it indicates no in the above-mentioned situations.

Optionally, in the embodiment of the present application, whether the first frequency domain part includes the part of the fourth sub-band that does not belong to the first reserved resource; and/or whether the division of RBG in the first frequency domain part includes the part of the fourth sub-band that does not belong to the first reserved resource; and/or whether the division of PRG in the first frequency domain part includes the part of the fourth sub-band that does not belong to the first reserved resource may be determined according to specific conditions, for example, based on a resource demand by communication between the terminal device and network device.

Optionally, in the embodiment of the present application, the third listening bandwidth is a proper subset of the first listening bandwidth; a channel is listened on the first listening bandwidth; and the first device communicates with the second device through the third frequency domain part, in the case of obtaining a channel use right of the third listening bandwidth and not obtaining the channel use right of the first listening bandwidth.

It should be understood that the position relationship between the plurality of listening bandwidths is shown above with reference to FIG. 3, but FIG. 3 is only an implementation in the embodiment of the present application. In the embodiment of the present application, there may also be other position relationship between the plurality of listening bandwidths.

Figure 5:
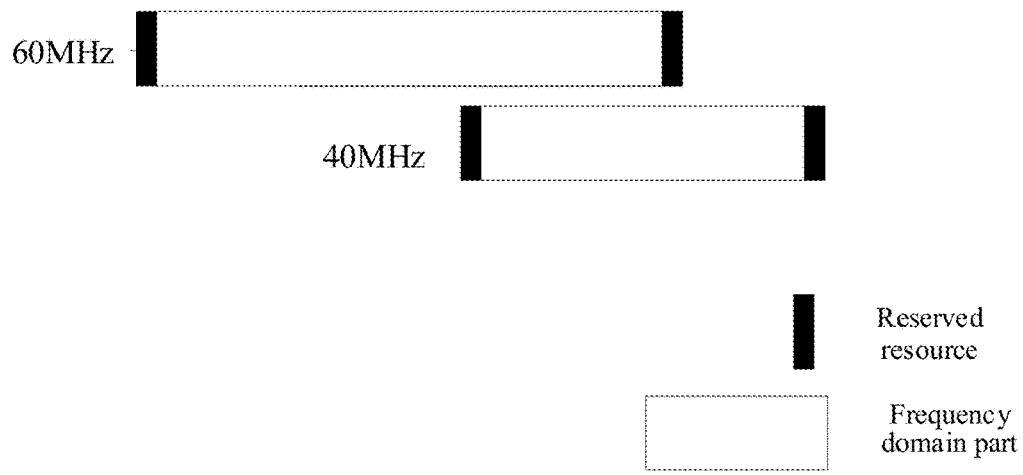
FIG. 5 is a schematic diagram of a relationship between various listening bandwidths according to an embodiment of the present application.

For example, as shown in FIG. 5, each of the two listening bandwidths respectively has a part of frequency domain resource overlapping with another listening bandwidth. The overlapping part may include the resource in a part of the reserved resource and a part of the frequency domain part.

Figure 6:
FIG. 6 is a schematic diagram of a relationship between various listening bandwidths according to an embodiment of the present application

For another example, as shown in FIG. 6, each of the two listening bandwidths respectively has only a part of the reserved resource overlapping with the reserved resource of the other listening bandwidth.

It should be understood that in the embodiment of the present application, when the reserved resource of multiple other listening bandwidths belongs to a certain listening bandwidth and does not overlap with the reserved resource of this listening bandwidth, it may be that the reserved resources of the multiple other listening bandwidths all belong to the frequency domain part of the listening bandwidth (or participate in the division of RBG or PRG in the frequency domain part of the listening bandwidth), or it may also be that the reserved resources of the partial bandwidth of the multiple other listening bandwidths belong to the frequency domain part of the listening bandwidth (or participate in the division of RBG or PRG in the frequency domain part of the listening bandwidth).

Optionally, in the embodiment of the present application, the first device is the network device and the second device is the terminal device, and fifth indication information is sent to the second device by the first device, where the fifth indication information is used to determine at least one of a frequency domain position of the first frequency domain part, a frequency domain position of the first reserved resource, and a frequency domain position of the BWP to which the first frequency domain part belongs.

Optionally, in the embodiment of the present application, the first device is the terminal device and the second device is the network device, and sixth indication information sent by the second device is received by the first device, where the sixth indication information is used to determine at least one of a frequency domain position of the first frequency domain part, a frequency domain position of a first reserved resource, and a frequency domain position of the BWP to which the first frequency domain part belongs.

Therefore, in the embodiment of the application, the first device communicates with the second device through the first frequency domain part in the first listening bandwidth of the unlicensed frequency band, where the first listening bandwidth includes the first frequency domain part and the first reserved resource, the first reserved resource is located on at least one side of the first listening bandwidth, and the first reserved resource is the guard band. Since at least one side of the first frequency domain part for communication has the reserved resource as the guard band, it can prevent the communication performed by the first frequency domain part from causing interference to other communications. Specifically, it can prevent the signal transmission of the NR-U system on the listening bandwidth from interfering with the signal transmission of heterogeneous system (such as Wi-Fi or LTE-LAA system) on the adjacent channel, so as to better realize the coexist of the systems on the unlicensed frequency band.

Figure 7:
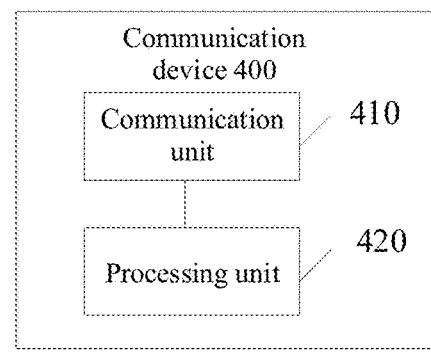
FIG. 7 is a schematic block diagram of a communication device according to an embodiment of the present application.

FIG. 7 is a schematic block diagram of a communication device 400 according to an embodiment of the present application. The communication device 400 may include a communication unit 410. The communication device 400 may be a first device, which may communicate with the second device.

The communication unit 410 is configured to communicate with a second device through a first frequency domain part in a first listening bandwidth of an unlicensed frequency band, the first listening bandwidth includes the first frequency domain part and a first reserved resource, the first reserved resource is located on at least one side of the first listening bandwidth, and the first reserved resource is a guard band.

Optionally, in the embodiment of the present application, the first reserved resource includes a first sub-band, and the first sub-band is located on a low-frequency side of the first listening bandwidth.

Optionally, in the embodiment of the present application, a size of the first sub-band is determined based on at least one of:
 a radio frequency index requirement, a size of the first listening bandwidth, a subcarrier spacing of the first frequency domain part, a size of the first frequency domain part, a position of the first sub-band, a position of the first listening bandwidth, and a size of a second sub-band included in the first reserved resource and located on a high-frequency side of the first listening bandwidth.

Optionally, in the embodiment of the present application, the first reserved resource includes a second sub-band, and the second sub-band is located on a high-frequency side of the first listening bandwidth.

Optionally, in the embodiment of the present application, a size of the second sub-band is determined based on at least one of:
 a radio frequency index requirement, a size of the first listening bandwidth, a subcarrier spacing of the first frequency domain part, a size of the first frequency domain part, a position of the second sub-band, a position of the first listening bandwidth, and a size of the first sub-band included in the first reserved resource and located on a low-frequency side of the first listening bandwidth.

Optionally, in the embodiment of the present application, a third sub-band of the first reserved resource belongs to a second listening bandwidth of the unlicensed frequency band, and the second listening bandwidth includes a second frequency domain part and a second reserved resource, where the second frequency domain part is available for wireless communication transmission, the second reserved resource is located on at least one side of the second listening bandwidth, the second reserved resource is a guard band, and at least part of frequency domain resources of the second reserved resource and the third sub-band do not overlap Optionally, in the embodiment of the present application, the second frequency domain part includes a part of the third sub-band that does not belong to the second reserved resource; and/or,
 a division of resource block group (RBG) in the second frequency domain part includes the part of the third sub-band that does not belong to the second reserved resource; and/or,
 a division of precoding resource block group (PRG) in the second frequency domain part includes the part of the third sub-band that does not belong to the second reserved resource.

Optionally, in the embodiment of the present application, the second frequency domain part includes an integer number of frequency domain units continuous in frequency domain.

Optionally, in the embodiment of the present application, the second frequency domain part does not include a part of the third sub-band that does not belong to the second reserved resource; and/or,
 a division of resource block group (RBG) in the second frequency domain part does not include the part of the third sub-band that does not belong to the second reserved resource; and/or,
 a division of precoding resource block group (PRG) in the second frequency domain part does not include the part of the third sub-band that does not belong to the second reserved resource.

Optionally, in the embodiment of the present application, the first device is a terminal device and the second device is a network device, and the communication unit 410 is further configured to:
 receive first indication information sent by the second device,
 where the first indication information is used to determine whether the second frequency domain part includes a part of the third sub-band that does not belong to the second reserved resource; and/or,
 the first indication information is used to determine whether a division of RBG in the second frequency domain part includes the part of the third sub-band that does not belong to the second reserved resource; and/or,
 the first indication information is used to determine whether a division of PRG in the second frequency domain part includes the part of the third sub-band that does not belong to the second reserved resource.

Optionally, in the embodiment of the present application, the first device is a network device and the second device is a terminal device, and the communication unit 410 is further configured to send second indication information to the second device,
 where the second indication information is used to determine whether the second frequency domain part includes a part of the third sub-band that does not belong to the second reserved resource; and/or,
 the second indication information is used to determine whether a division of RBG in the second frequency domain part includes the part of the third sub-band that does not belong to the second reserved resource; and/or,
 the second indication information is used to determine whether a division of PRG in the second frequency domain part includes the part of the third sub-band that does not belong to the second reserved resource.

Optionally, in the embodiment of the present application, the first listening bandwidth is a proper subset of the second listening bandwidth; and the communication unit 410 is further configured to:
  listen for a channel on the second listening bandwidth; and
  communicate with the second device through the first frequency domain part, in the case of obtaining a channel use right of the first listening bandwidth and not obtaining the channel use right of the second listening bandwidth.

Optionally, in the embodiment of the present application, the communication unit 410 is further configured to:
  listen for a channel on the first listening bandwidth; and
  communicate, by the first device, with the second device through the first frequency domain part, in the case of obtaining a channel use right of the first listening bandwidth.

Optionally, in the embodiment of the present application, a fourth sub-band of a third reserved resource of a third listening bandwidth of the unlicensed frequency band belongs to the first listening bandwidth;
  where the third listening bandwidth includes a third frequency domain part and the third reserved resource, and the third frequency domain part is available for wireless communication transmission, the third reserved resource is located on at least one side of the third listening bandwidth, the third reserved resource is a guard band, and at least part of frequency domain resources of the first reserved resource and the fourth sub-band do not overlap.

Optionally, in the embodiment of the present application, the first frequency domain part includes a part of the fourth sub-band that does not belong to the first reserved resource; and/or,
  a division of resource block group (RBG) in the first frequency domain part includes the part of the fourth sub-band that does not belong to the first reserved resource; and/or,
  a division of precoding resource block group (PRG) in the first frequency domain part includes the part of the fourth sub-band that does not belong to the first reserved resource.

Optionally, in the embodiment of the present application, the first frequency domain part includes an integer number of frequency domain units continuous in frequency domain.

Optionally, in the embodiment of the present application, the first frequency domain part does not include a part of the fourth sub-band that does not belong to the first reserved resource; and/or,
  a division of resource block group (RBG) in the first frequency domain part does not include the part of the fourth sub-band that does not belong to the first reserved resource; and/or,
  a division of precoding resource block group (PRG) in the first frequency domain part does not include the part of the fourth sub-band that does not belong to the first reserved resource.

Optionally, in the embodiment of the present application, the first device is a terminal device and the second device is a network device, and the communication unit 410 is further configured to:
  receive third indication information sent by the second device,
  where the third indication information is used to determine whether the first frequency domain part includes a part of the fourth sub-band that does not belong to the first reserved resource; and/or,
  the third indication information is used to determine whether a division of the RBG in the first frequency domain part includes the part of the fourth sub-band that does not belong to the first reserved resource; and/or,
  the third indication information is used to determine whether a division of the PRG in the first frequency domain part includes the part of the fourth sub-band that does not belong to the first reserved resource.

Optionally, in the embodiment of the present application, the first device is a network device and the second device is a terminal device, and the communication unit 410 is further configured to:
  send fourth indication information to the second device,
  where the fourth indication information is used to determine whether the first frequency domain part includes a part of the fourth sub-band that does not belong to the first reserved resource; and/or,
  the fourth indication information is used to determine whether a division of RBG in the first frequency domain part includes the part of the fourth sub-band that does not belong to the first reserved resource; and/or,
  the fourth indication information is used to determine whether a division of PRG in the first frequency domain part includes the part of the fourth sub-band that does not belong to the first reserved resource.

Optionally, in the embodiment of the present application, the third listening bandwidth is a proper subset of the first listening bandwidth; and the communication unit 410 is further configured to:
  listen for a channel on the first listening bandwidth; and
  communicate with the second device through the third frequency domain part, in the case of obtaining a channel use right of the third listening bandwidth and not obtaining a channel use right of the first listening bandwidth.

Optionally, in the embodiment of the present application, the device 400 further includes a processing unit 420, which is configured to:
  determine a start position of a first bandwidth part (BWP) and/or a length of the first BWP from a BWP set based on at least one of a size of the first listening bandwidth, a subcarrier spacing of the first listening bandwidth, and a frequency domain position of the first listening bandwidth, where the first BWP belongs to the first listening bandwidth and includes the first frequency domain part.

Optionally, in the embodiment of the present application, the first device is a network device and the second device is a terminal device, and the communication unit 410 is further configured to:
  send fifth indication information to the second device, where the fifth indication information is used to determine at least one of a frequency domain position of the first frequency domain part, a frequency domain position of a first frequency domain resource, and a frequency domain position of the BWP to which the first frequency domain part belongs.

Optionally, in the embodiment of the present application, the first device is a terminal device and the second device is a network device, and the communication unit 410 is further configured to:
  receive sixth indication information sent by the second device, where the sixth indication information is used to determine at least one of a frequency domain position of the first frequency domain part, a frequency domain position of a first frequency domain resource, and a frequency domain position of the BWP to which the first frequency domain part belongs.

It should be understood that the communication device 400 may correspond to the first device (which may be the terminal device or the network device) in the method embodiment, and may be used to implement various methods of the method embodiment of the present application, which are not repeated herein for brevity.

Figure 8:
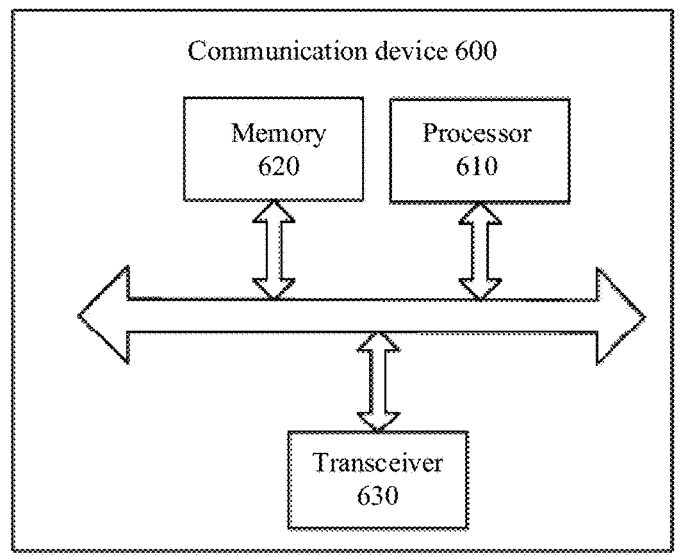
FIG. 8 is a schematic block diagram of a communication device according to an embodiment of the present application.

FIG. 8 is a schematic structural diagram of a communication device 600 according to an embodiment of the present application. The communication device 600 shown in FIG. 8 includes a processor 610, and the processor 610 may call and run a computer program from a memory, to implement the method in the embodiment of the present application.

Optionally, as shown in FIG. 8, the communication device 600 may further include a memory 620. The processor 610 may call and run a computer program from the memory 620 to implement the method in the embodiment of the present application.

The memory 620 may be a separate device independent of the processor 610, or may be integrated in the processor 610.

Optionally, as shown in FIG. 8, the communication device 600 may further include a transceiver 630, and the processor 610 may control the transceiver 630 to communicate with other devices, specifically, may send information or data to other devices, or receive information or data sent by other devices.

The transceiver 630 may include a transmitter and a receiver. The transceiver 630 may further include an antenna, and the number of antennas may be one or more.

Optionally, the communication device 600 may specifically be the first device of the embodiment of the application, and the communication device 600 may implement the corresponding process implemented by the first device in various methods of the embodiments of the application, which are not repeated herein for brevity.

Figure 9:
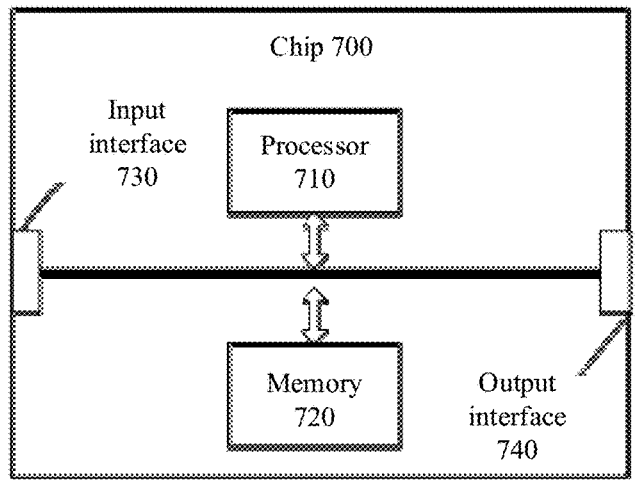
FIG. 9 is a schematic block diagram of a chip provided by an embodiment of the present application.

FIG. 9 is a schematic structural diagram of a chip of an embodiment of the present application. The chip 700 shown in FIG. 9 includes a processor 710, and the processor 710 may call and run a computer program from the memory to implement the method in the embodiment of the present application.

Optionally, as shown in FIG. 9, the chip 700 may further include a memory 720. The processor 710 may call and run a computer program from the memory 720 to implement the method in the embodiment of the present application.

The memory 720 may be a separate device independent of the processor 710, or may be integrated in the processor 710.

Optionally, the chip 700 may further include an input interface 730. The processor 710 may control the input interface 730 to communicate with other devices or chips, and specifically, may obtain information or data sent by other devices or chips.

Optionally, the chip 700 may further include an output interface 740. The processor 710 may control the output interface 740 to communicate with other devices or chips, and specifically, may output information or data to other devices or chips.

Optionally, the chip may be applied to the first device in the embodiment of the present application, and the chip may implement the corresponding process implemented by the first device in various methods of the embodiments of the present application, which are not repeated herein for brevity.

It should be understood that the chip mentioned in the embodiment of the present application may also be referred to as a system-level chip, system chip, chip system, system chip-on-chip, or the like.

Figure 10:
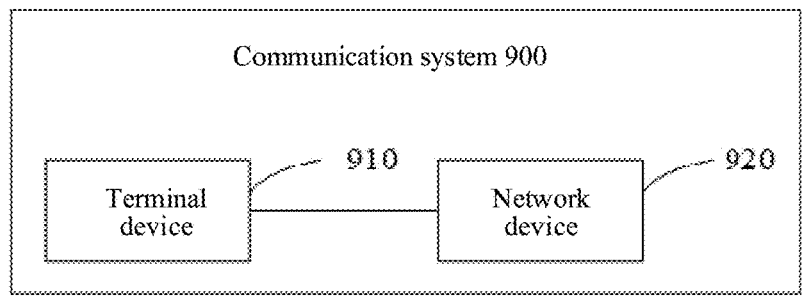
FIG. 10 is a schematic block diagram of a communication system according to an embodiment of the present application.

FIG. 10 is a schematic block diagram of a communication system 900 according to an embodiment of the present application. As shown in FIG. 10, the communication system 900 includes a terminal device 910 and a network device 920.

The terminal device 910 may be used to implement the corresponding function implemented by the terminal device in the above method, and the network device 920 may be used to implement the corresponding function implemented by the network device in the above method, which are not repeated herein for brevity.

It should be understood that the processor of the embodiment of the present application may be an integrated circuit chip with signal processing capability. In the implementation process, the steps of the foregoing method embodiments may be completed by hardware integrated logic circuits in the processor or instructions in the form of software. The above-mentioned processor may be a general-purpose processor, a Digital Signal Processor (DSP), an Application Specific Integrated Circuit (ASIC), a Field Programmable Gate Array (FPGA), or other programmable logic device, discrete gate, transistor logic device or discrete hardware component. The methods, steps, and logical block diagrams disclosed in the embodiments of the present application may be implemented or executed. The general-purpose processor may be a microprocessor or the processor may also be any conventional processor or the like. The steps of the method disclosed in connection with the embodiments of the present application may be directly embodied as being executed and completed by a hardware decoding processor, or executed and completed by a combination of hardware and software modules in the decoding processor. The software module may be located in a mature storage medium in the field such as random access memory, flash memory, read-only memory, programmable read-only memory, electrically erasable programmable memory, register, or the like. The storage medium is located in the memory, and the processor reads the information in the memory and completes the steps of the above method in combination with its hardware.

It may be understood that the memory in the embodiment of the present application may be volatile memory or non-volatile memory, or may include both volatile and non-volatile memory. The non-volatile memory may be Read-Only Memory (ROM), Programmable ROM (PROM), Erasable PROM (EPROM), Electrically EPROM (EEPROM) or flash memory. The volatile memory may be Random Access Memory (RAM), which is used as an external cache. By way of exemplary but not restrictive description, many forms of RAM are available, for example, Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), and Direct Rambus RAM (DR RAM). It should be noted that the memory of the system and method described herein are intended to include, but are not limited to, these and any other suitable types of memories.

It should be understood that the foregoing memory is exemplary but not restrictive. For example, the memory in the embodiment of the present application may also be static RAM (SRAM), dynamic RAM (DRAM), synchronous DRAM (SDRAM), double data rate SDRAM (DDR SDRAM), enhanced SDRAM (ESDRAM), synch link DRAM (SLDRAM), Direct Rambus RAM (DR RAM), and the like. That is to say, the memory in the embodiment of the present application is intended to include, but not limited to, these and any other suitable types of memories.

An embodiment of the present application further provides a computer-readable storage medium for storing a computer program.

Optionally, the computer-readable storage medium may be applied to the network device in the embodiment of the application, and the computer program causes the computer to execute the corresponding process implemented by the network device in various methods of the embodiments of the application, which are not repeated herein for brevity.

Optionally, the computer-readable storage medium may be applied to the mobile terminal/terminal device in the embodiment of the present application, and the computer program causes the computer to execute the corresponding process implemented by the mobile terminal/terminal device in various methods of the embodiments of the present application, which are not repeated herein for brevity.

An embodiment of the present application further provides a computer program product, including computer program instructions.

Optionally, the computer program product may be applied to the network device in the embodiment of the application, and the computer program instructions cause the computer to the corresponding process implemented by the network device in various methods of the embodiments of the present application, which are not repeated herein for brevity.

Optionally, the computer program product may be applied to the mobile terminal/terminal device in the embodiment of the present application, and the computer program instructions cause the computer to execute the corresponding process implemented by the mobile terminal/terminal device in various methods of the embodiments of the present application, which are not repeated herein for brevity.

An embodiment of the present application further provides a computer program.

Optionally, the computer program may be applied to the network device in the embodiment of the present application, and when the computer program runs on the computer, the computer is caused to execute the corresponding process implemented by the network device in various methods of the embodiments of the present application, which are not repeated herein for brevity.

Optionally, the computer program may be applied to the mobile terminal/terminal device in the embodiments of the present application. When the computer program runs on the computer, the computer executes various the corresponding processes in the methods of the embodiments of the present application implemented by the mobile terminal/terminal device, which will not be repeated herein for briefly.

A person of ordinary skill in the art may be aware that the units and algorithm steps of the examples described in the embodiments disclosed herein can be implemented by electronic hardware or a combination of computer software and electronic hardware. Whether these functions are executed by hardware or software depends on the specific application and design constraints of the technical solution. Professionals and technicians can use different methods for each specific application to implement the described functions, but such implementation should not be considered beyond the scope of the present application.

Those skilled in the art can clearly understand that, for the convenience and conciseness of description, the specific working process of the system, device and unit described above may refer to the corresponding processes in the foregoing method embodiment, which will not be repeated herein.

In the several embodiments provided in the application, it should be understood that the disclosed system, device, and method may be implemented in other ways. For example, the device embodiments described above are merely illustrative. For example, the division of the units is only a logical function division, and there may be other divisions in actual implementation. For example, multiple units or components may be combined or integrated into another system, or some features may be omitted or not implemented. In addition, the displayed or discussed mutual coupling or direct coupling or communication connection may be indirect coupling or communication connection through some interfaces, devices or units, and may be in electrical, mechanical or other forms.

The units described as separate components may or may not be physically separated, and the components displayed as units may or may not be physical units, that is, they may be located in one place, or they may be distributed on a plurality of network units. Some or all of the units may be selected according to actual needs to achieve the objectives of the solutions of the embodiments.

In addition, the functional units in each embodiment of the present application may be integrated into one processing unit, or each unit may exist alone physically, or two or more units may be integrated into one unit.

If the function is implemented in the form of a software functional unit and sold or used as an independent product, it can be stored in a computer readable storage medium. Based on this understanding, the technical solution of the application essentially or the part that contributes to the existing technology or the part of the technical solution may be embodied in the form of a software product, and the computer software product is stored in a storage medium, and a number of instructions are included to make a computer device (which may be a personal computer, a server, a network device, or the like) execute all or part of the steps of the methods described in the various embodiments of the present application. The aforementioned storage media include: U disk, mobile hard disk, Read-Only Memory (ROM), Random Access Memory (RAM), magnetic disk or optical disk and other media that can store program codes.

The foregoing are only specific embodiments of the present application, and the scope of the present application is not limited thereto. The changes or substitutions readily contemplated by any person skilled in the art within the technical scope disclosed in the present application should be covered by the scope of the application. Therefore, the scope of the present application should be determined by the scope of the claims.

What is claimed is:

1. A wireless communication method, comprising:
communicating, by a first device, with a second device through a first frequency domain part in a first listening bandwidth of an unlicensed frequency band, wherein the first listening bandwidth comprises the first frequency domain part and a first reserved resource, the first reserved resource is located on at least one side of the first listening bandwidth, and the first reserved resource is a guard band;
wherein a fourth sub-band of a third reserved resource of a third listening bandwidth of the unlicensed frequency band belongs to the first listening bandwidth;
wherein the third listening bandwidth comprises a third frequency domain part and the third reserved resource, wherein the third frequency domain part is available for wireless communication transmission, the third reserved resource is located on at least one side of the third listening bandwidth, the third reserved resource is a guard band, and at least part of frequency domain resources of the first reserved resource and the fourth sub-band do not overlap.

2. The method according to claim 1, wherein the first reserved resource comprises a first sub-band, and the first sub-band is located on a low-frequency side of the first listening bandwidth.

3. The method according to claim 2, wherein a size of the first sub-band is determined based on at least one of:
a radio frequency index requirement, a size of the first listening bandwidth, a subcarrier spacing of the first frequency domain part, a size of the first frequency domain part, a position of the first sub-band, a position of the first listening bandwidth, and a size of a second sub-band comprised in the first reserved resource and located on a high-frequency side of the first listening bandwidth.

4. The method according to claim 1, wherein the first reserved resource comprises a second sub-band, and the second sub-band is located on a high-frequency side of the first listening bandwidth.

5. The method according to claim 4, wherein a size of the second sub-band is determined based on at least one of:
a radio frequency index requirement, a size of the first listening bandwidth, a subcarrier spacing of the first frequency domain part, a size of the first frequency domain part, a position of the second sub-band, a position of the first listening bandwidth, and a size of the first sub-band comprised in the first reserved resource and located on a low-frequency side of the first listening bandwidth.

6. The method according to claim 1, wherein a third sub-band of the first reserved resource belongs to a second listening bandwidth of the unlicensed frequency band, wherein the second listening bandwidth comprises a second frequency domain part and a second reserved resource, wherein the second frequency domain part is available for wireless communication transmission, the second reserved resource is located on at least one side of the second listening bandwidth, the second reserved resource is a guard band, and at least part of frequency domain resources of the second reserved resource and the third sub-band do not overlap.

7. The method according to claim 6, wherein the first device is a terminal device and the second device is a network device, and the method further comprises: receiving, by the first device, first indication information sent by the second device,
wherein the first indication information is used to determine whether the second frequency domain part comprises a part of the third sub-band that does not belong to the second reserved resource; and/or,
the first indication information is used to determine whether a division of RBG in the second frequency domain part comprises the part of the third sub-band that does not belong to the second reserved resource; and/or,
the first indication information is used to determine whether a division of PRG in the second frequency domain part comprises the part of the third sub-band that does not belong to the second reserved resource.

8. The method according to claim 6, wherein the first device is a network device and the second device is a terminal device, and the method further comprises: sending, by the first device, second indication information to the second device,
wherein the second indication information is used to determine whether the second frequency domain part comprises a part of the third sub-band that does not belong to the second reserved resource; and/or,
the second indication information is used to determine whether a division of RBG in the second frequency domain part comprises the part of the third sub-band that does not belong to the second reserved resource; and/or,
the second indication information is used to determine whether a division of PRG in the second frequency domain part comprises the part of the third sub-band that does not belong to the second reserved resource.

9. The method according to claim 6, wherein the first listening bandwidth is a proper subset of the second listening bandwidth; and the method further comprises:
listening for a channel on the second listening bandwidth; and
the communicating, by the first device, with the second device through the first frequency domain part in the first listening bandwidth of the unlicensed frequency band comprises:
communicating, by the first device, with the second device through the first frequency domain part, in the case of obtaining a channel use right of the first listening bandwidth and not obtaining the channel use right of the second listening bandwidth.

10. A communication device, which is a first device, comprising:
a processor; and
a memory,
wherein the memory is configured to store a computer program, and the processor is configured to call and run the computer program stored in the memory, to:
communicate with a second device through a first frequency domain part in a first listening bandwidth of an unlicensed frequency band, wherein the first listening bandwidth comprises the first frequency domain part and a first reserved resource, the first reserved resource is located on at least one side of the first listening bandwidth, and the first reserved resource is a guard band;
wherein a fourth sub-band of a third reserved resource of a third listening bandwidth of the unlicensed frequency band belongs to the first listening bandwidth;
wherein the third listening bandwidth comprises a third frequency domain part and the third reserved resource, wherein the third frequency domain part is available for wireless communication transmission, the third reserved resource is located on at least one side of the third listening bandwidth, the third reserved resource is a guard band, and at least part of frequency domain resources of the first reserved resource and the fourth sub-band do not overlap.

11. The communication device according to claim 10, wherein the processor is further configured to:
listen for a channel on the first listening bandwidth; and
communicate, by the first device, with the second device through the first frequency domain part, in the case of obtaining a channel use right of the first listening bandwidth.

12. The communication device according to claim 10, wherein the first frequency domain part comprises a part of the fourth sub-band that does not belong to the first reserved resource.

13. The communication device according to claim 12, wherein the first frequency domain part comprises an integer number of frequency domain units continuous in frequency domain.

14. The communication device according to claim 10, wherein the first frequency domain part does not comprise a part of the fourth sub-band that does not belong to the first reserved resource.

15. The communication device according to claim 10, wherein the first device is a terminal device and the second device is a network device, and the processor is further configured to:
receive third indication information sent by the second device,
wherein the third indication information is used to determine whether the first frequency domain part comprises a part of the fourth sub-band that does not belong to the first reserved resource.

16. The communication device according to claim 10, wherein the first device is a network device and the second device is a terminal device, and the processor is further configured to send fourth indication information to the second device, and
wherein the fourth indication information is used to determine whether the first frequency domain part comprises a part of the fourth sub-band that does not belong to the first reserved resource.

17. The communication device according to claim 10, wherein the third listening bandwidth is a proper subset of the first listening bandwidth; and the processor is further configured to:
listen for a channel on the first listening bandwidth; and
communicate with the second device through the third frequency domain part, in the case of obtaining a channel use right of the third listening bandwidth and not obtaining a channel use right of the first listening bandwidth.

18. The communication device according to claim 10, wherein the processor is further configured to:
determine a starting position of a first bandwidth part (BWP) and/or a length of the first BWP from a BWP set based on at least one of a size of the first listening bandwidth, a subcarrier spacing of the first listening bandwidth, and a frequency domain position of the first listening bandwidth, wherein the first BWP belongs to the first listening bandwidth and comprises the first frequency domain part.

19. The communication device according to claim 10, wherein the first device is a network device and the second device is a terminal device, and the processor is further configured to:
send fifth indication information to the second device, wherein the fifth indication information is used to determine at least one of a frequency domain position of the first frequency domain part, a frequency domain position of a first frequency domain resource.

20. The communication device according to claim 10, wherein the first device is a terminal device and the second device is a network device, and the processor is further configured to:
receive sixth indication information sent by the second device, wherein the sixth indication information is used to determine at least one of a frequency domain position of the first frequency domain part, a frequency domain position of a first frequency domain resource.

* * * * *